Feb. 11, 1969   H. E. NICHOLS   3,427,041
ELEVATABLE VEHICLE
Filed June 7, 1967   Sheet 1 of 4

INVENTOR.
HUGH E. NICHOLS
BY
Wm. H. Dean

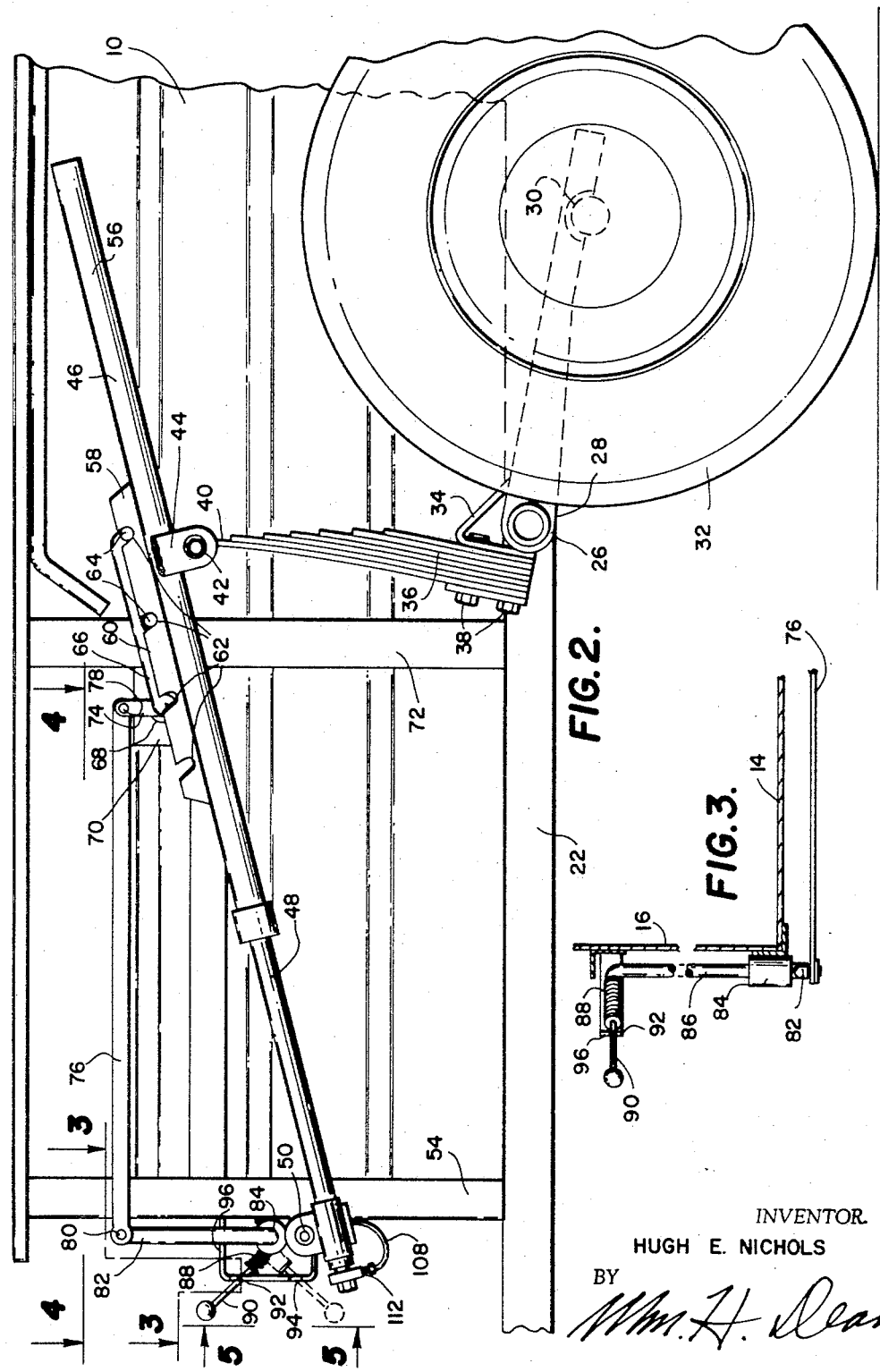

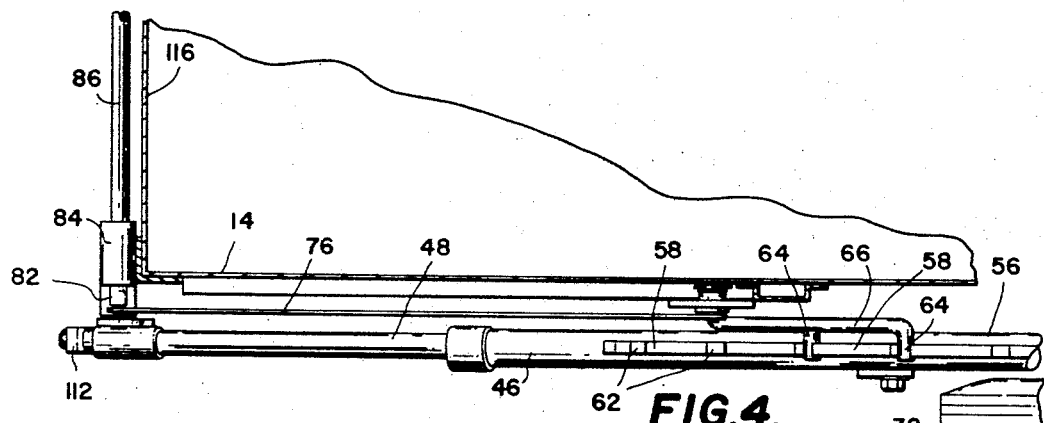
FIG.4.
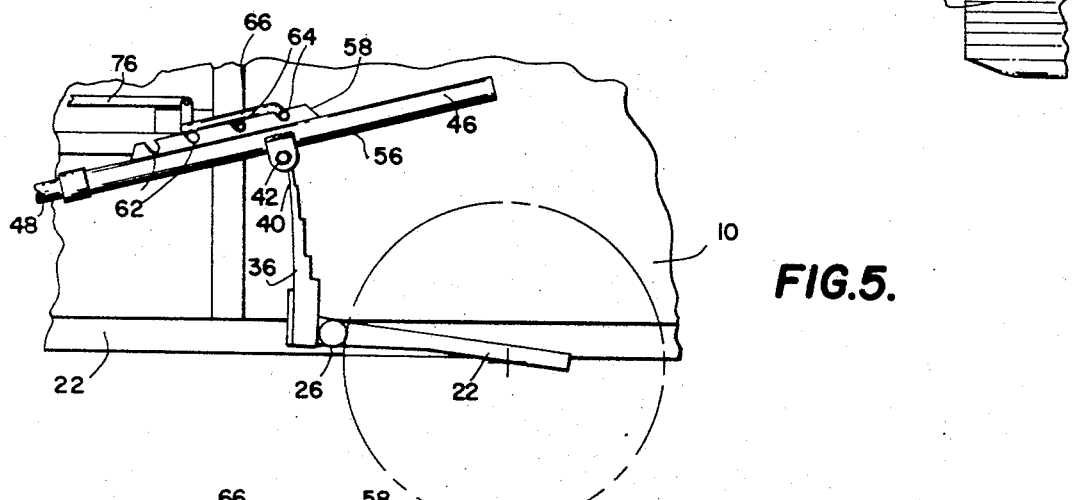
FIG.5.
FIG.6.
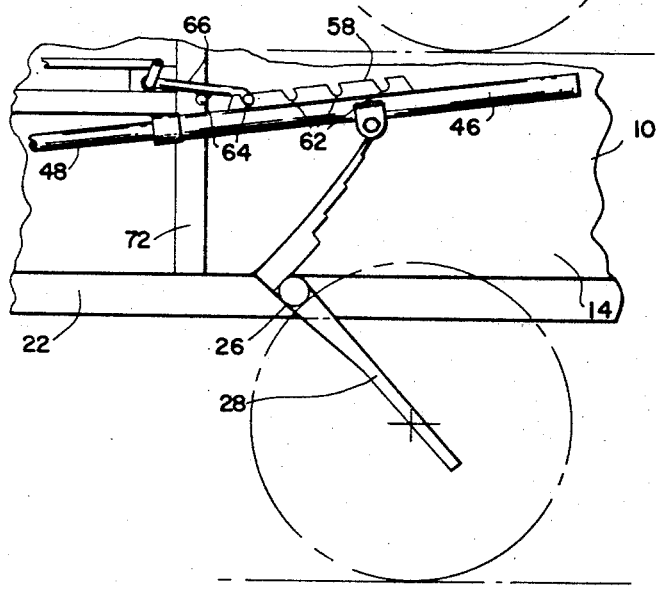
INVENTOR.
HUGH E. NICHOLS

INVENTOR.
HUGH E. NICHOLS

United States Patent Office 3,427,041
Patented Feb. 11, 1969

3,427,041
ELEVATABLE VEHICLE
Hugh E. Nichols, Rte. 1, Box 16,
Higley, Ariz. 85236
Filed June 7, 1967, Ser. No. 644,385
U.S. Cl. 280—43.18
Int. Cl. B62d 21/14; B62b 1/04
8 Claims

ABSTRACT OF THE DISCLOSURE

An elevatable vehicle having hydraulic lift mechanism adapted to elevate a body of said trailer with respect to the wheels, and wherein the hydraulic mechanism is connected to an upstanding spring at each opposite end of a pivoted bar to which the wheels are connected in a bell crank disposition, and wherein latch mechanism is adapted to hold the hydraulic mechanism in close proximity to the normally upper ends of said springs, whereby close coupling and latching of the suspension means of the trailer thereof to alleviate undue suspension deflection of the body of the vehicle or trailer when it is moved over uneven surfaces.

---

This invention relates to an elevatable vehicle, and more particularly to improvements in elevatable trailers employing hydraulic lift mechanism to raise the body of the trailer on wheels thereof from a position near the ground to a desired running level.

Background of the invention

In accordance with prior art vehicles, such as elevatable trailers having hydraulic lift mechanisms for lifting the bodies of the vehicles relative to the ground, latching means has been remotely related to the application of force by the suspension means of the vehicle, such that considerable deflection of the body, and the suspension mechanism has caused vehicles such as trailers, to twist considerably and to be unstable when moved over uneven surfaces, such as bumpy roads, or the like. In connection with hydraulic lift mechanism for elevatable vehicles, such as trailers, latch mechanism has been used and normally located near the forward portion of the vehicle bodies for latching the hydraulic lift mechanism in certain elevated or lowered positions. Due to the remote disposition of such latching mechanisms, considerable leverage of the suspension mechanism tends to allow twisting and deflection of the body and suspension mechanism on opposite sides of the vehicle, such that corresponding wheels and suspension mechanism at opposite sides of the vehicle flex relative to remote portions of the mechanism near forward end portions of the body structure of such vehicles, and thus cause unstable structural response to the movement of the vehicle wheels over uneven surfaces, such as bumpy roads, or the like.

Summary of the invention

The present invention comprises a vehicle body having a lower portion in which a wheel supporting bar is pivotally mounted; the wheel supporting bar being connected to a pair of upstanding springs which are disposed adjacent opposite sides of the body; the upper portions of the springs being pivotally connected to a hydraulic cylinder means having a latch bar in connection therewith; the latch bar being closely adjacent the said upper ends of the springs, and engaged by a latch member mounted on the frame of the vehicle body, the latch member being closely adjacent the upper end of each respective spring in order to minimize the relative angular deflection of the body bewteen opposite sides of the vehicle of the invention during the engagement of uneven roadway surfaces by the wheels on opposite ends of the bar, as they alternately react against the springs at opposite sides of the vehicle body.

Additionally, the present invention comprises a novel torsion bar control and latch means for retaining the aforementioned latch members in either engaged or disengaged position relative to the latch bars on the hydraulic cylinder means of the invention.

Accordingly, it is an object of the present invention to provide an improved elevatable vehicle having novel hydraulic lift mechanism therefor, and particularly comprising engageable and disengageable latch means located in close proximity to the spring suspension for the wheels of the vehicle to minimize relative deflection of the suspension, and the body between opposite sides thereof, and with respect to wheels at opposite sides of the body, which may be operated in engagement with uneven roadway surfaces.

Another object of the invention is to provide a novel torsion spring or torsion bar holding and actuating mechanism for retaining latch members of the invention in or out of engagement with latch bars on the hydraulic cylinder suspension means of the invention.

Brief description of the drawings

FIG. 2 is an enlarged fragmentary side elevational view of the structure, shown in FIG. 1, and showing by broken lines a varying position of the latch member control mechanism thereof;

FIG. 3 is a fragmentary plan sectional view taken from the line 3—3 of FIG. 2;

FIG. 4 is a plan sectional view taken from the line 4—4 of FIG. 2;

FIG. 5 is a fragmentary reduced side elevational view showing the structure, as disclosed in FIG. 2, but omitting one of the vehicle wheels, and showing diagrammatically the suspension disposition of the invention in a partially elevated position;

FIG. 6 is a view similar to FIG. 5, but showing the suspension mechanism in a substantially greater elevated position;

Description of the preferred embodiments

Figure 1:
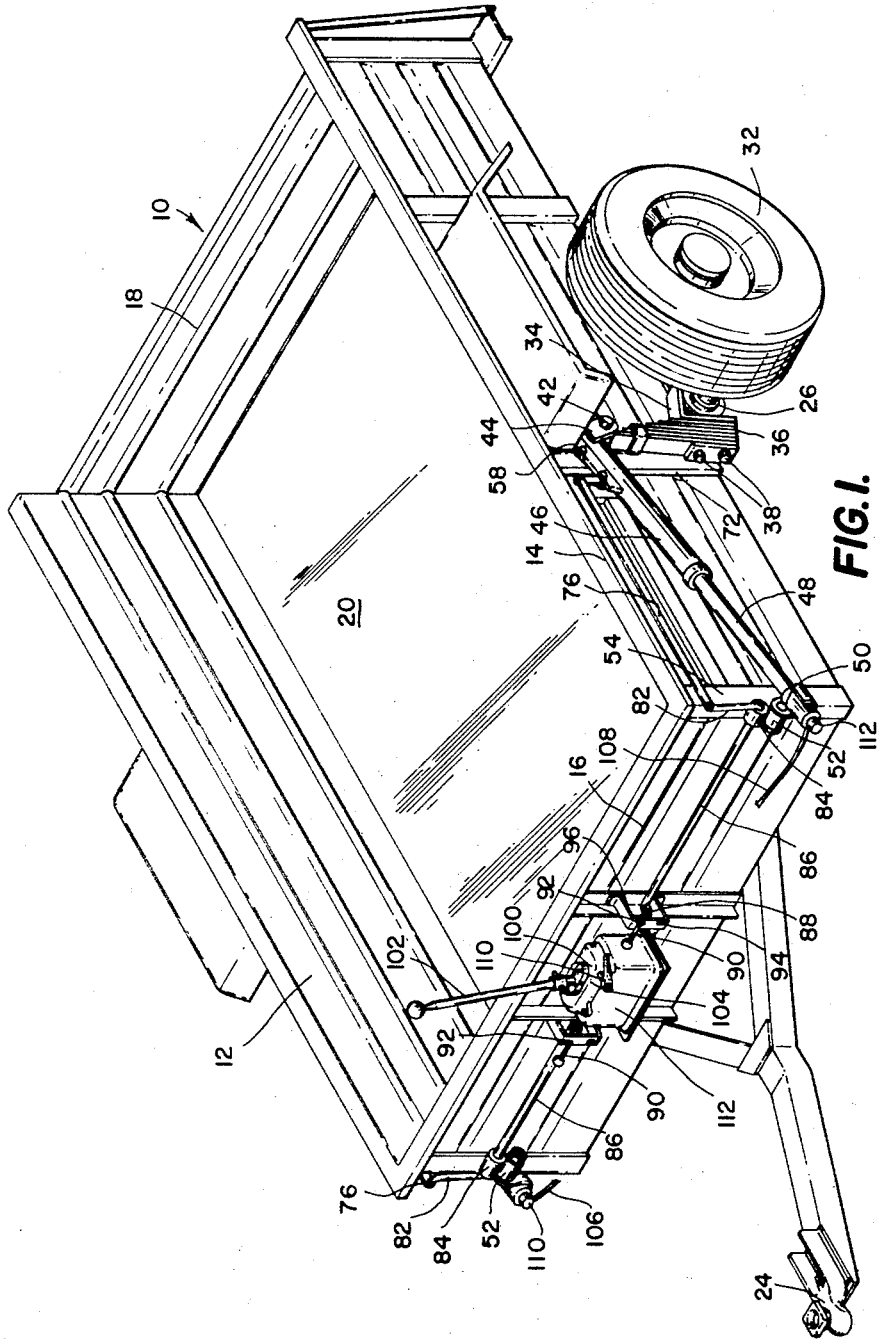
FIG. 1 is a perspective view of an elevatable trailer showing improved hydraulic cylinder elevating and suspension means, and novel latch means therefor.

As shown in FIG. 1 of the drawings, the elevatable trailer or vehicle of the present invention is provided with a body 10 having opposite sides 12 and 14, as well as front and rear portions 16 and 18, respectively. The body 10 is also provided with a bottom portion 20, the overall shape of the body portion being substantially box-shaped, however, other bodies of the various shapes may be utilized in accordance with the present invention. The bottom or lower portion 20 of the body 10 is supported on a frame 22 having a trailer hitch 24 on the forward portion thereof, it being understood, however, that the invention may apply to a rearward portion of a powered vehicle, as well as the trailer, as disclosed.

Pivotally mounted in connection with the frame 22, at the lower portion of the body 10, is a wheel mounting bar 26 having a substantially horizontal axis. This bar 26 is provided with bell crank levers 28 fixed to opposite outwardly extending ends thereof which extend outwardly from the body 10, as shown best in FIGS. 1 and 2 of the drawings. Each arm 28 extends in a direction from the bar 26 rearwardly toward the rearward portion 18 of the body 10, such that the arms 28 are generally disposed in a backward cantilever arrangement with the bar 26.

Mounted on each arm 28 is a wheel spindle 30 of substantially conventional construction, provided to rotatably mount a respective wheel 32 on each cantilever arm 28, each arm 28 extending at substantially right angles to the bar 26, and/or laterally relative thereto.

Fixed to each opposite end of the bar 26 is a spring mount 34 with which an upwardly directed spring 36 is secured by bolts 38. Each spring 36 is provided with an upwardly extending portion 40, terminating in a conventional eye through which a bolt 42 extends. The bolt 42 also extends through a conventional U-shaped shackle 44 mounted on a respective hydraulic cylinder means 46. The hydraulic cylinder means 46 is provided with a telescopically mounted element 48 which is pivoted by a pin 50 to a pin bearing 52 mounted on each respective forward corner portion at the front 16 of the body 10. Each pin bearing 52 is generally at the corner of the body near the intersection of the respective side, and the forward portion 16 of the body. The pin bearing 52 is welded or otherwise secured to an upright portion 54 of the frame 22.

Each hydraulic cylinder means is provided with a pair of relatively telescopic members, including the telescopic member 48 which is telescopically mounted in the respective member 56 of the hydraulic cylinder means.

Mounted on the telescopic member 56 is a latch bar 58 having an upwardly directed edge 60 provided with a plurality of spaced notches 62 therein, these notches being open at the upper edge 60, and engageable by conforming projections 64 of a latch member 66 which is pivotally mounted about a bearing 68 supported on a plate 70 fixed to an upstanding element 72 of the frame 22. The latch member 66 is provided with a bell crank lever portion 74 to which a link 76 is pivotally connected by means of a pin 78. The link 76, at its end opposite to the pin 78, is pivotally connected by means of another pin 80 to an upstanding control lever 82 which is pivotally mounted in a bearing 84 fixed to the upstanding frame portion 54 of the main frame 22.

Integral with each control lever 82 is a horizontal bar portion 86, as shown in FIG. 1 of the drawings, and connected to this bar portion is a coil spring 88 coupled to a lever handle 90, which is adapted to be engaged in either of two slots 92 or 94 in a bracket 96 extending forwardly from the front or forward wall 16 of the body 10. Thus, when the handle 90 is in the slot 92, the link 76 is forced backwardly, and forces the engaging portions 64 of the latch member 66 into the notches 62.

When the handle 90 is moved to the broken line position, as shown in FIG. 2 of the drawings, and engaged in the notch 94, the latch member 66 is pivoted upwardly, such that the engaging portions 64 are out of the notches 62.

The spring 88 in connection with each portion 86, provides for tension to hold the respective arm 82, either forwardly or rearwardly for holding the respective latch members 66 disengaged or engaged with the latch bar 58 on the respective hydraulic cylinder means 46.

A hydraulic fluid pump 100 is provided with a pump actuating lever 102, and coupled to the pump is a valve body 104 controlling the flow of pressure fluid to tubular conduits 106 and 108, which are connected by respective fittings 110 and 112 at the ends of the telescopic hydraulic cylinder elements 48 of the hydraulic cylinder means 46. The valve body 104 is provided with a valve control lever 110 adapted for use in switching hydraulic fluid with respect to the hydraulic cylinder means 46, and a fluid sump 112. In one position, the valve 110 will allow fluid to pass from the hydraulic cylinder means 46 into the fitting 112, and in another position the valve will control the movement of hydraulic fluids from the pump and into the hyraulic cylinder means 46 for extending them and for pivoting the bar 26 in a clockwise direction, as shown in FIGS. 2, 5 and 6 for pivoting the arm portions 20 downwardly and relatively raising the body 10, as indicated in FIGS. 5 and 6 of the drawings.

It will be seen that each latch bar 58 is located close to the upper end 40 of a respective spring 36 on each respective side of the vehicle body, and thereby forms a suspension element for retaining each arm 28 in cantilever relationship with the bar 26 for supporting the body 10 in various elevated positions in accordance with the engagement with latch member 66 in connection with each of the said respective latch bars 58. It will be seen that each latch bar 58 is provided with a plurality of notches, greater than the number of projections 64 on the respective latch member 66, so that the latch member 66, as shown in FIG. 5, may be engaged with some of the notches 62 for holding the body 10 in one position, whereas the engaging portions 64 may be engaged with different notched portions 62 to hold the body 10 in a much greater elevated position, as indicated in FIG. 6 of the drawings.

It will be further appreciated by those skilled in the art that the latch bar 58 on each hydraulic cylinder means 46 is close to the normally upper end of each spring 36, and that the respective latch member 66 is mounted on a rigid frame element 72 close to the upper end 40 of the respective spring 36. This close coupling of the latch mechanism and the suspension spring mechanism, and the direct connection thereof through the frame member 72 to the base frame 22, provides for substantially rigid coupling of the suspension system to the body, and the frame to alleviate the transfer of forces, opposed by the wheels 32, running over rough surfaces such that the close coupling prevents undue deflection of the body and frame from a side to side structure of the vehicle or trailer.

It will be seen from FIGS. 5 and 6, that when the latch member 66 is engaged with the foremost notches in the latch bar 58, such that the arms 28 are held in a downwardly directed angular position. The body 10 is greatly elevated above the ground when the latch member 66 is engaged in the rearmost notches in the latch bar 58, such that the arms 28 are more nearly parallel with the bottom of the body 10, and thus support the body 10 at a lower elevation than when the arms 28 are directed downwardly at a steep angle, as indicated in FIG. 6 of the drawings.

Figure 7:
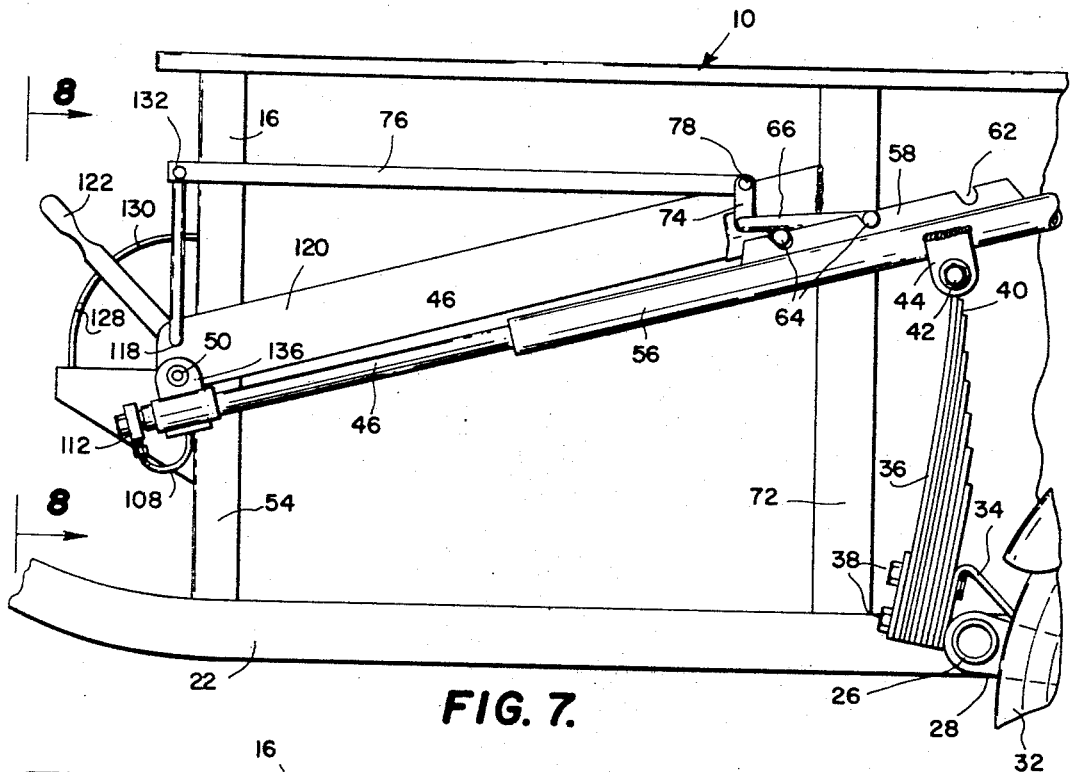
FIG. 7 is a fragmentary side elevational view similar to FIG. 2, but showing a modification of the present invention.
Figure 8:
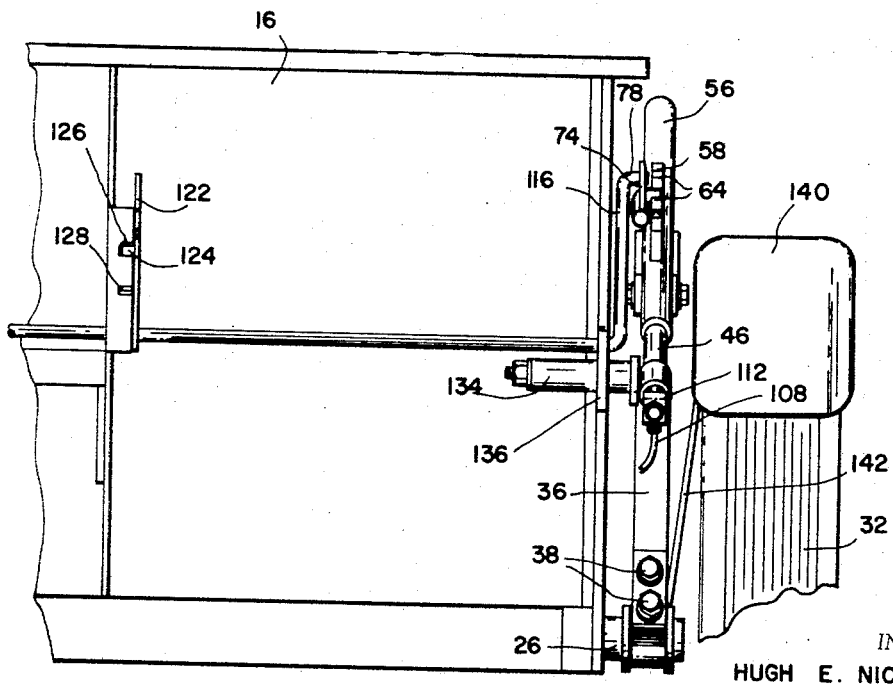
FIG. 8 is a fragmentary front elevational view taken from the line 8—8 of FIG. 7.

The modification of the invention, shown in FIGS. 7 and 8 of the drawings, may constitute a preferred form of the invention. In this modified form of the invention, a torsion bar 114 is provided with a pair of integral lever portions 116 similar to the lever portions 82, hereinbefore described. Since the torsion bar 114 is a single bar, and is provided with lever portions 116 integral with opposite ends, it will be understood from FIGS. 7 and 8 of the drawings, that opposite sides of the trailer or vehicle are similar, and that opposite wheel and suspension structures are similar to that hereinbefore described. The torsion bar 114 is mounted at opposite ends in bearing portions 118 which constitute brace members 120 extending from the forward frame member 54 to the vertical frame member 72, the brace members 120 tending to distribute stress from the latch member 66 in a direction forwardly and downwardly towards the front and lower portion of the body 10.

Fixed to the torsion bar 114 is a hand lever 122 having a projection 124 engageable in a pair of spaced notches 126 and 128 in a quadrant bracket 130 secured to the front wall portion 16 of the body 10.

The torsion bar or torsion spring 114 is adapted to be torsionally deflected by actuation of the arm 122 for either holding the respective latch members 66 in engaged position or disengaged position relative to the latch bars 58, as hereinbefore described. Each lever portion 116 of the torsion bar 114 is pivotally connected at 132 with one end of one of the links 76.

The torsion bar 114, when in the position shown in FIG. 7, wherein the handle 122 is in its uppermost position with its projection engaging the notch 126, tends to hold the link 126 rearward, and to hold the latch member 66 in engagement with the latch bar 58, as hereinbefore described.

As shown in FIG. 8 of the drawings, the lower end of the telescopic member 46 is pivoted in a bearing 134 mounted on an extending end 136 of the brace member 120.

Disposed over each wheel 32 is a fender 140 carried by brackets 142 mounted on the respective arm 28, such that the fenders pivot directly with the wheels, and are maintained in a substantially constant spaced relationship therewith at all times.

It will be obvious to those skilled in the art that various modifications of the present invention may be resorted to in a manner limited only by a just interpretation of the following claims.

I claim:

1. In an elevatable trailer, the combination of: a box shaped body having a lower portion, forward and rearward ends and upstanding sides; a bar pivoted to said lower portion of said body between said forward and rearward ends, said bar having opposite ends directed outward at said opposite sides of said body; wheel mounting arms fixed to said opposite ends of said bar and extending laterally relative thereto; wheels rotatably mounted on said arms at locations spaced laterally from said bar; a pair of springs fixed to said bar at said opposite ends thereof; each of said springs having a connection portion extending upwardly away from said bar; a hydraulic actuator means pivotally connected to each of said springs at said upwardly extending connection portions; said hydraulic actuator means extendable and retractable, said hydraulic actuator means having an extending end projecting toward said forward end of said body; mount means for pivotally securing said extending end of each of said cylinder means at a respective side of said body near said forward end thereof; means for conducting fluid under pressure into each of said hydraulic actuator means for causing pivotal movement of said springs and said bar together with said arms to adjust the elevation of said body with respect to the ground; a latch bar carried by each hydraulic actuator means; said latch bar disposed generally in the rear half area of the hydraulic actuator means, said latch bar also being close to said connection portion of each respective spring; each of said latch bars having a notched structure; a latch member pivoted on each respective side of said body close to each of said latch bars; each of said latch members having a latch portion movable into and out of engagement in said notched structure of respective ones of said latch bars whereby forces imposed upon said springs are transferred directly to said body above said first mentioned bar and close to said connection portions of said springs.

2. The invention, as defined in claim 1, wherein; a common control lever for said latch members is pivotally mounted on said body; and means coupling said control lever to said latch members for pivoting them into and out of engagement with said notched structures of said respective latch bars.

3. The invention, as defined in claim 2, wherein: a torsion bar is provided with opposite ends disposed adjacent said opposite sides of said body, and wherein last mentioned means comprises links pivotally interconnecting said torsion spring with said latch members; and means for locking said torsion spring in position to hold said latch members engaged with said latch bars or out of engagement therewith.

4. The invention, as defined in claim 1, wherein: a frame structure supports said lower portion of said body and the pivotal mounting of said first mentioned bar; said frame having upstanding portions at the forward portions of said body and at said sides thereof; said frame having second upstanding portions disposed near said upwardly directed connection portions of said springs; a brace member having a frame element interconnecting each of said last mentioned upstanding members and each forwardly disposed upstanding member; said latch members pivotally mounted on said brace member.

5. The invention, as defined in claim 4, wherein: said latch members are generally bell crank structures; actuating links pivotally connected to said latch members; and a resilient actuating and holding means coupled through said links for holding said latch members in or out of engagement with said latch bars.

6. The invention, as defined in claim 5, wherein: said resilient holding means comprises a torsion bar of resilient character, having opposite ends disposed near said opposite sides of said body and having angularly disposed lever portions coupled pivotally to said link; and a lever connected to an intermediate portion of said torsion bar; said lever having latch means in connection therewith; and secondary latch means coupled to said body and having a pair of latch portions engageable by latch means of said lever for holding said torsion bar and said latch members in or out of engagement respectively relative to said latch bars on said cylinder means.

7. The invention, as defined in claim 1, wherein: said first mentioned latch bars are provided with a plurality of notched portions; and said latch members being provided with a plurality of notch engaging portions.

8. The invention, as defined in claim 7, wherein: said latch bar is provided with a greater number of notches than said engaging portions of said latch members to provide for the holding of said actuator means in variously adjusted positions and to thereby retain said arms on said first mentioned bar at different angles for holding said body in various elevated positions with respect to the ground.

References Cited

UNITED STATES PATENTS 2,754,128  7/1956  Schramm _____ 280—43.18

LEO FRIAGLIA, *Primary Examiner.*

ROBERT R. SONG, *Assistant Examiner.*

U.S. Cl. X.R.

280—43.23